(12) United States Patent
Goetz (10) Patent No.: US 11,196,253 B2
(45) Date of Patent: Dec. 7, 2021

(54) METHOD AND SYSTEM FOR ELECTRONIC CURRENT CONTROL FOR A FLEXIBLE DC BATTERY

(71) Applicant: Dr. Ing. h.c. F. Porsche Aktiengesellschaft, Stuttgart (DE)

(72) Inventor: Stefan Goetz, Forstern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 12 days.

(21) Appl. No.: 16/846,726

(22) Filed: Apr. 13, 2020

(65) Prior Publication Data
US 2020/0328593 A1    Oct. 15, 2020

(30) Foreign Application Priority Data

Apr. 12, 2019    (DE) ............... 10 2019 109 723.1

(51) Int. Cl.
| | | |
|---|---|---|
| *H02J 1/10* | (2006.01) | |
| *G05F 1/577* | (2006.01) | |
| *H02J 1/02* | (2006.01) | |

(52) U.S. Cl.
CPC ............. *H02J 1/102* (2013.01); *G05F 1/577* (2013.01); *H02J 1/02* (2013.01)

(58) Field of Classification Search
CPC .... H02J 1/102; H02J 1/02; H02J 1/109; H02J 2310/46; G05F 1/577; H02H 9/02; H02H 7/18
See application file for complete search history.

(56) References Cited

U.S. PATENT DOCUMENTS

| 2009/0212634 A1 | 8/2009 | Kojima et al. |
| 2009/0230917 A1 | 9/2009 | Kojima et al. |
| (Continued) | | |

FOREIGN PATENT DOCUMENTS

| DE | 10 2010 041 046 | 3/2012 |
| DE | 10 2011 108 920 | 1/2013 |
| (Continued) | | |

OTHER PUBLICATIONS

Goetz, et al., "Modular Multilevel Converter With Series and Parallel Module Connectivity: Topology and Control," Power Electronics, IEEE Transactions on, vol. 30, No. 1, pp. 203, 215, 2015, doi: 10.1109/TPEL.2014.2310225.

(Continued)

*Primary Examiner* — Hal Kaplan
*Assistant Examiner* — Thai H Tran
(74) *Attorney, Agent, or Firm* — Gerald E. Hespos; Michael J. Porco; Matthew T. Hespos (57) ABSTRACT

The invention relates to a method and system for electronic current control for a flexible DC battery pack, in which the battery pack has a plurality of flexibly interconnectable modules having a respective energy store and at least two respective controllable switches and the modules are electrically connected to one another to form a section having a first and a second section end and the two section ends are connected to a respective high-voltage connection, in which the at least two switches of a respective module interrupt a battery current I or interconnect the respective energy store at least in series or parallel with or to bypass the respective energy store of the respectively adjacent module, in which the flexible interconnection of the modules is controlled by a battery control unit and hence a prescribed DC voltage V is provided.

12 Claims, 9 Drawing Sheets

(56) References Cited

U.S. PATENT DOCUMENTS

| | | | |
|---|---|---|---|
| 2013/0278190 A1 | 10/2013 | Fink | |
| 2014/0226377 A1 | 8/2014 | Goetz et al. | |
| 2014/0307358 A1* | 10/2014 | Duan | H02H 3/087 |
| | | | 361/93.1 |
| 2015/0263624 A1* | 9/2015 | Nobe | H02M 1/32 |
| | | | 323/299 |
| 2017/0207631 A1 | 7/2017 | Helling et al. | |
| 2018/0219478 A1 | 8/2018 | Goetz | |
| 2019/0084438 A1* | 3/2019 | Takamatsu | H02J 7/0024 |

FOREIGN PATENT DOCUMENTS

| | | |
|---|---|---|
| DE | 10 2014 207 485 | 10/2015 |
| DE | 10 2015 112 512 | 2/2017 |

OTHER PUBLICATIONS

German Examination Report dated Jan. 23, 2020.

* cited by examiner

METHOD AND SYSTEM FOR ELECTRONIC CURRENT CONTROL FOR A FLEXIBLE DC BATTERY

CROSS REFERENCE TO RELATED APPLICATION

This application claims priority under 35 USC 119 to German Patent Appl. No. 10 2019 109 723.1 filed on Apr. 12, 2019, the entire disclosure of which is incorporated herein by reference.

BACKGROUND

Field of the Invention. The present invention relates to a method for electronic current control for a flexible DC battery. Said current control is implemented in a battery control unit and can restrict the current above a prescribed threshold. Further, a system for this electronic current control is claimed.

Related Art. A conventional traction battery, for example of an electric vehicle, is implemented in largely voltage-controlled fashion as a hardwired battery pack. If there are very small load impedances in the high-voltage system outside the battery, a very high current accordingly flows from the battery to the high-voltage system. This occurs in particular in the event of a short or in the event of faults in the electric motor, such as for example in the event of a blockage, a fault in a torque control, a fault in a rotor angle estimation or in the event of intentional emergency braking. In all of these cases, a large flow of current needs to be limited or interrupted as promptly as possible in order to prevent damage.

In conventional vehicles, the high-voltage battery is for this reason always designed to be disconnectable by means of contactors and additional fuses. Both contactors and fuses are relatively sluggish, however, and require many milliseconds to cause the circuit to open in the event of a disconnect request or shorts. Additionally, they are expensive and require a very large installation space.

Further, states in which there are intermittently low impedances also exist in conventional systems outside a fault situation. To avoid current fluctuations, for example, relatively high capacitances may be formed in a high-voltage system both from plus to minus by what are known as X capacitors and by DC-link capacitances, which for the most part are in the millifarad range in the case of an inverter or a voltage transformer, for example, and from the high-voltage connections to the vehicle bodywork by what are known as Y capacitors. When contactors are closed or opened, however, the more or less voltage-controlled high-voltage battery means that such capacitors need to be either charged slowly via a series resistor and a precharge relay, which is relatively large and expensive owing to the high voltage, or discharged again following disconnection. The latter takes place for the most part slowly as passive discharge via a continuously connected discharge resistor having a time constant of many seconds in combination with actively connected discharge resistors and time constants of less than 5 seconds.

In U.S. Patent Publication No. 2009/0230917 A1, a fuse protects a battery from an excessively high current. So that this fuse does not trip, a method is described that restricts the battery current as soon as the battery voltage leaves a prescribed range.

U.S. Patent Publication No. 2009/0212634 A1 controls a battery current by means of a PID controller. The battery current is moreover restricted above a prescribed threshold, this requiring the battery main contactor to have an input capacitor that is charged abruptly when the contactor is closed.

Such precharged circuits consisting of a contactor and a discharge resistor are avoided by the document DE 10 2010 041 046 by means of a reconfigurable DC battery that produces a voltage by configuring the battery interconnection and charges a DC link with the present DC-link voltage by means of switching modulation and hysteresis control of the voltage. However, this type of voltage-oriented precharge has the disadvantage that, despite switching modulation, a step size of switching steps means that high current spikes arise. Further, at least one fuse also continues to be absolutely necessary in order to break the connection in the event of a short in the high-voltage DC link and not to feed the short, and/or at least one contactor at the battery output continues to be necessary in order to be able to isolate the battery from the DC link.

Against this background, it is an object of the present invention to provide a method for current control for a DC battery that protects the latter from an excessively high current in the event of a short in the high-voltage system without being reliant on space-occupying and cost-intensive contactors and/or nonresettable fuses. In contrast to a relatively sluggish switch-on and switch-off process for contactors, the aim is for a battery current to be able to be quickly interrupted or restricted in the event of an excessively high current rise. Further, the aim is to present a system having this current control.

SUMMARY

To achieve the aforementioned object, a method for electronic current control for a flexible DC battery pack is proposed in which the battery pack has a plurality of flexibly interconnectable modules having a respective energy store and at least two respective controllable switches, wherein the modules are electrically connected to one another to form a section having a first and a second section end and the two section ends are connected to a respective high-voltage connection. The at least two switches of a respective module can interrupt a battery current I or interconnect the respective energy store at least in series or parallel with or to bypass the respective energy store of the respectively adjacent module. The flexible interconnection of the modules is controlled by a battery control unit, as a result of which a prescribed DC voltage V is provided. A first current sensor is arranged between the first of the two section ends and the high-voltage connection connected thereto, and said first current sensor is at least indirectly connected to the battery control unit. It may also be directly connected to the battery control unit. Electronic control then controls the battery current I by means of the interconnection of the modules by the battery control unit.

For the method according to the invention, a flexibly interconnectable module can have for example a first input connection and a second input connection, and also a first output connection and a second output connection. In an exemplary configuration of the module with a minimal arrangement of two switches, a first switch is arranged between the first input connection and the first output connection, and a second switch is arranged between the second input connection and the second output connection. The energy store of the module is arranged between the first output connection and the second output connection. When both switches are open, the battery current is interrupted by the module and hence also by the entire section or battery pack. When both switches are closed, the energy store is interconnected in parallel with further energy stores of adjacent modules, depending on the position of the switches therein. When only one switch from the two switches is open and the other is closed, the energy store of the module under consideration is either interconnected in series with the energy stores in adjacent modules or bypassed, depending on the position of the switches of said modules. The respective switch can be, for example, a power semiconductor switch controlled by the battery control unit via a gate. Battery control can be carried out by a computer program, for example, wherein the battery control unit comprises a computer processor.

A fundamental example of a flexible DC battery useable for the purposes of the invention is described in the document DE 10 2011 108 920 A1. Depending on the number of implemented switches, various switching states can be achieved. It is also possible for a flexible DC battery to be represented by a modular multilevel convertor having series and parallel interconnection capability, as described for example by "Goetz, S. M.; Peterchev, A. V.; Weyh, T., "Modular Multilevel Converter With Series and Parallel Module Connectivity: Topology and Control," Power Electronics, IEEE Transactions on, vol. 30, no.1, pp.203,215, 2015, doi: 10.1109/TPEL.2014.2310225". A significant advantage of flexible DC batteries of this kind is that the interconnection of the modules allows implementability of the prescribed DC voltage, which can be configured in accordance with a respective power requirement by a load, for example, in the case of an electric vehicle with an electric motor as the propulsion drive. In this case, adaptation of the DC voltage is particularly advantageous to achieve as high as possible a modulation index for an inverter, for example, said inverter being needed to convert the DC voltage provided by the battery into an AC voltage necessary for operating the electric motor, for example. Generally, electromagnetic compatibility is better the higher the modulation index.

In one embodiment of the method according to the invention, at least one inductance L is arranged upstream of at least one high-voltage connection within a circuit of the battery pack, as a result of which the DC voltage V provided by the battery control unit by means of the modules is used to limit a magnitude of a change of current dI/dt in accordance with V=L·dI/dt. The flexible DC batteries referenced in exemplary fashion in the paragraph above are, even if, according to the invention, provided with electronic current control, also known as voltage-source converters. A change of current dI/dt can thus be limited by means of the arrangement of an inductance L in accordance with the formula V=L·dI/dt. The inductance L may, for example, already be provided by a leakage inductance of the circuit upstream of the high-voltage connections, which leakage inductance may have been increased by pushed-on ferrite or iron cores.

Further, it is alternatively conceivable to arrange a defined inductance in the form of at least one electronic component, for example, at least one coil, within the circuit. This can be done, for example, upstream of one of the high-voltage connections in series with the circuit of the DC battery.

Further still, it is conceivable to split the defined inductance L over two electronic components, for example, as a first coil, which is arranged in series upstream of the first high-voltage connection, and a second coil, which is arranged in series upstream of the second high-voltage connection. This configuration would have the advantage that an inductance would highly likely still be in the circuit even in the event of ground fault or bodywork short inside the DC battery.

As a further embodiment, it is conceivable to arrange the defined inductance L approximately at the center of the section between at least one connection between two adjacent modules. If, for example, two modules are connected to one another by means of two connections, then, for example, the defined inductance L can be split over two electrical components, one being arranged in each of the two connections.

As a further embodiment still, it is conceivable to split the defined inductance L over a multiplicity of electronic components having a correspondingly low inductance and to arrange each of the electronic components between a respective connection between the modules.

In a further embodiment of the method according to the invention, the electronic control restricts the battery current I to a current level $I_{restricted}$ if a predetermined threshold $I_{threshold}$ is exceeded. The predetermined threshold $I_{threshold}$ is determined, for example, according to a current level compatible with the technical specifications for the energy stores and/or according to the current level to be assessed as a short-circuit current for the whole system on the basis of technical estimation. The restriction can be accomplished for example by means of a Heaviside function based on $$I_{restricted} = (I - I_{threshold}) \cdot \text{Heaviside}(I - I_{threshold}) \quad (1)$$

wherein the Heaviside function thus contributes nothing below $I_{threshold}$ and assumes a value of one above $I_{threshold}$.

In a further embodiment still of the method according to the invention, the electronic control is carried out by a PI (proportional integral) controller having a proportional element and an integral element. The PI controller can likewise operate continuously during operation of the flexible DC battery, for example, to supply power to the electric motor in the electric vehicle that is in a driving mode, and in so doing can continuously control the battery current and/or restrict it on the basis of equation (1), for example.

Electronic control of the battery current, both by the battery control unit alone and with a PI controller that in turn supplies its output signal to the battery control unit, can be regarded as control superimposed on the provision of the DC voltage by the battery control unit. As mentioned above, this can involve restricting the current level at least to a predetermined threshold $I_{threshold}$. If need be, a function of a fuse can also additionally be reproduced using the electronic control, i.e., an interruption to the battery current I by the battery control unit in the event of a lowest current level $I_{fuse\ threshold}$ that is still tolerated or tolerable being exceeded, expressed as a function with lowpass(I):

$$\text{Interruption if lowpass}(I) > I_{fuse\ threshold}. \quad (2)$$

In this instance, variations in the lowpass function by means of the battery current I are also conceivable, for example, to be independent of a current direction:

$$\text{Interruption if lowpass}(I^2) > I^2_{fuse\ threshold} \quad (3)$$

or $$\text{Interruption if lowpass}(\text{abs}(I)) > I_{fuse\ threshold}. \quad (4)$$

In a continuingly further embodiment of the method according to the invention, an output signal of the PI controller is supplied to a limiter. The limiter limits the output signal of the PI controller to a highest value conditional on a further processing of the output signal in its signal path to the battery control, above which highest value no further change in the result takes place. Engagement of the limiter can result in the integral element in the PI controller being stopped or a current gain being reduced.

In a continuingly further embodiment still of the method according to the invention, an output signal of the PI controller is supplied to a compressor and the current gain is oriented to a gradient of a limiter transformation curve at a present operating point.

It is conceivable for the PI controller to be fed back (as described below in relation to FIG. 7) to avoid integration saturation, also referred to as anti-windup functionality by a person skilled in the art. This is advantageous in particular if the output signal of the PI controller is supplied to the limiter or to the compressor. The anti-windup functionality prevents the integrating element from charging slowly despite engagement of a limiter or compression by the compressor, for example, on account of a short, even though the output signal can not rise further at all downstream of the limiter or the compressor and a target voltage has not yet been reached.

In a further embodiment of the method according to the invention, a second current sensor is additionally also arranged between the second section end and the high-voltage connection connected thereto and is connected to the battery control unit, as a result of which a current spike on the respective high-voltage connection can be regulated. The respective current sensor at the respective high-voltage connection allows better control of a behavior of the DC battery in the case of more complicated shorts. Additionally, two current sensors afford redundancy in the event of a single current sensor failing.

In addition, the above inventive arrangement of the second current sensor allows an insulation or DC isolation of the battery pack from a surrounding area to be monitored. The surrounding area can be, for example, a battery housing and a vehicle bodywork. For this, a sum of the current levels measured by the two current sensors can be monitored the battery control unit. Since for example Kirchhoff's current continuity states that the same current must flow through both high-voltage connections, it is thus possible to identify discrepancies that may be caused by a short. As such, the following holds for a discrepancy D in the current levels $I_1$ and $I_2$ measured by the two current sensors at the high-voltage connections:

$$D = \Sigma_i I_i \neq 0. \quad (5)$$

In particular, it is possible for a dynamic range of the discrepancy, $$\frac{d}{dt}D = \frac{d}{dt}\sum_i I_i, \quad (6)$$

to be detected and combined, for example, with a value of the dynamic range D from equation (5). In the event of a fast rise with a subsequently high absolute value, it can be assumed that there is damage and a disconnection can be initiated.

In a further embodiment still of the method according to the invention, a fuse is additionally arranged between one of the two section ends and the high-voltage connection connected thereto, which fuse interrupts the battery current I if a predetermined fuse threshold $I_{fuse\ threshold}$ is exceeded. The fuse threshold is chosen to be of such magnitude that damage to the battery pack would occur only if said threshold were exceeded. The battery current is previously supposed to have been limited by a configuration of the method according to the invention described above, which is why, for example, $I_{fuse\ threshold} > I_{threshold}$ is supposed to apply. Only in the event of failure in this regard is the fuse arranged according to the invention then finally supposed to act.

Further, a system for electronic current control for a flexible DC battery pack is claimed, which system comprises a battery pack having a plurality of flexibly interconnectable modules, wherein each module has a respective energy store and at least two respective controllable switches by means of which a battery current I is interruptible or the respective energy store is interconnectable at least in series or parallel with or to bypass the respective energy store of a respectively adjacent module. The modules are electrically connected to one another to form a section having a first section end and a second section end and the two section ends are connected to a respective high-voltage connection. The system further comprises a battery control unit configured to control the flexible interconnection of the plurality of modules and hence to provide a prescribed DC voltage V. The system comprises a first current sensor, arranged between the first section end and the high-voltage connection connected thereto, that is at least indirectly connected to the battery control unit. Finally, the system is configured to electronically control the battery current I by means of the interconnection of the modules by the battery control unit.

In one configuration of the system according to the invention, the system additionally comprises a fuse configured to interrupt the battery current I if a predetermined threshold $I_{threshold}$ is exceeded.

In a further configuration of the system according to the invention, the system has a voltage measuring device, arranged between the two high-voltage connections, that is connected to the battery control unit.

In a further configuration still of the system according to the invention, at least one inductance L is arranged upstream of at least one high-voltage connection within a circuit of the battery pack to use the DC voltage V provided by the battery control unit by means of the modules to limit a magnitude of a change of current $dI/dt$ in accordance with $V = L \cdot dI/dt$.

In a continually further configuration of the system according to the invention, the system includes a PI controller having a proportional element and an integral element for carrying out the electronic control.

In a further configuration of the system according to the invention, a second current sensor is additionally arranged between the second section end and the high-voltage connection connected thereto, as a result of which a current spike on the respective high-voltage connection is regulatable and an insulation of the battery pack from a surrounding area is monitorable.

Further advantages and configurations of the invention are obtained from the description and the accompanying drawings.

It goes without saying that the features cited above and those yet to be explained below are usable not only in the respectively indicated combination but also in other combinations or on their own without departing from the scope of the present invention.

The figures are described consistently and generally; identical components have the same associated reference signs.

DETAILED DESCRIPTION

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software-based components.

It will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

Figure 1:
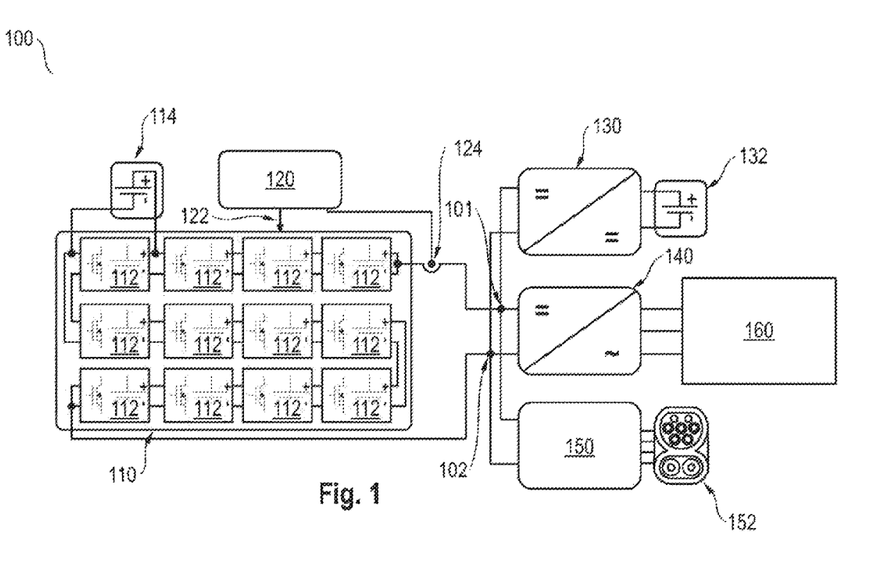
FIG. 1 schematically shows a configuration of a system according to the invention for providing current control for a flexible DC battery.
Figure 1A:
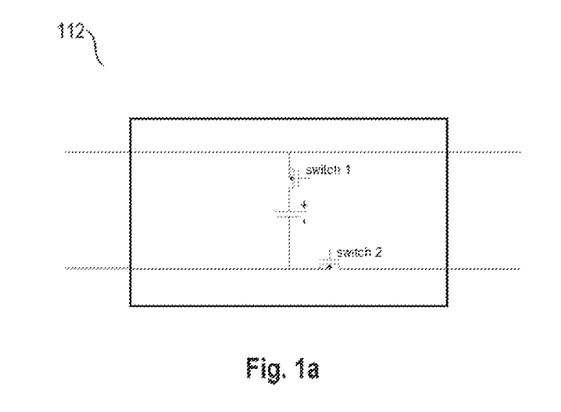
FIG. 1a shows an enlarged module of FIG. 1 with one possible arrangement of two switches in the module.

FIG. 1 schematically shows a configuration 100 of a system according to the invention for providing current control for a flexible DC battery, represented by 101, 102, 110, 112, 120, 122, 124. In the battery pack 110, modules 112, each having at least two controlled switches and an energy store, are connected to one another via two connections each to form a section, wherein in the case of a first and a last module a respective first module connection is connected to a respective second module connection to form a respective section end, and a first section end of the two section ends thus formed is connected to a first high-voltage connection 101 and a second section end is connected to a second high-voltage connection 102. The switches of the module 112, wherein exemplary, non-limiting arrangements can be found in the document DE 10 2015 112 512 A1, of the battery pack 110 are controlled by a battery control unit 120 via a battery control bus 122. According to the invention, in exemplary fashion, the first section end and the first high-voltage connection 101 have a current sensor 124 arranged between them that forwards a respectively flowing current level to the battery control unit 120 to control the battery current I in a manner implemented according to the invention. In exemplary fashion, a first low-voltage supply 114 at, for example, 12 V or 48 V is tapped off from one of the modules 112. It is conceivable for the modules 112 of the battery pack 110 to administer charge equalization among one another, under the control of the battery control unit 120. In exemplary fashion, a DC-DC converter 130, an inverter 140 and a charging unit 150 having a charging socket 152 are connected to the two high-voltage connections. The inverter 140 supplies power to an electric motor 160, for example, as a traction engine of an electric vehicle. A low-voltage supply system of an electric vehicle can be supplied with power at, for example, 12 V via the DC-DC converter 130 and a second low-voltage supply 132.

It is to be appreciated that the battery control unit 120 may include at least one processor and at least one memory device. The functions of the battery control unit 120 may be provided through the use of dedicated hardware as well as hardware capable of executing software in association with appropriate software. In one embodiment, some or all of the functions may be performed by at least one processor, such as a computer or an electronic data processor, digital signal processor or embedded micro-controller, in accordance with code, such as computer program code, software, and/or integrated circuits that are coded to perform such functions, unless indicated otherwise. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage. Other hardware, conventional and/or custom, may also be included in the battery control unit 120, such as a memory, input/output interfaces, a wireless transceiver, analog-to-digital converters, etc.

Figure 2:
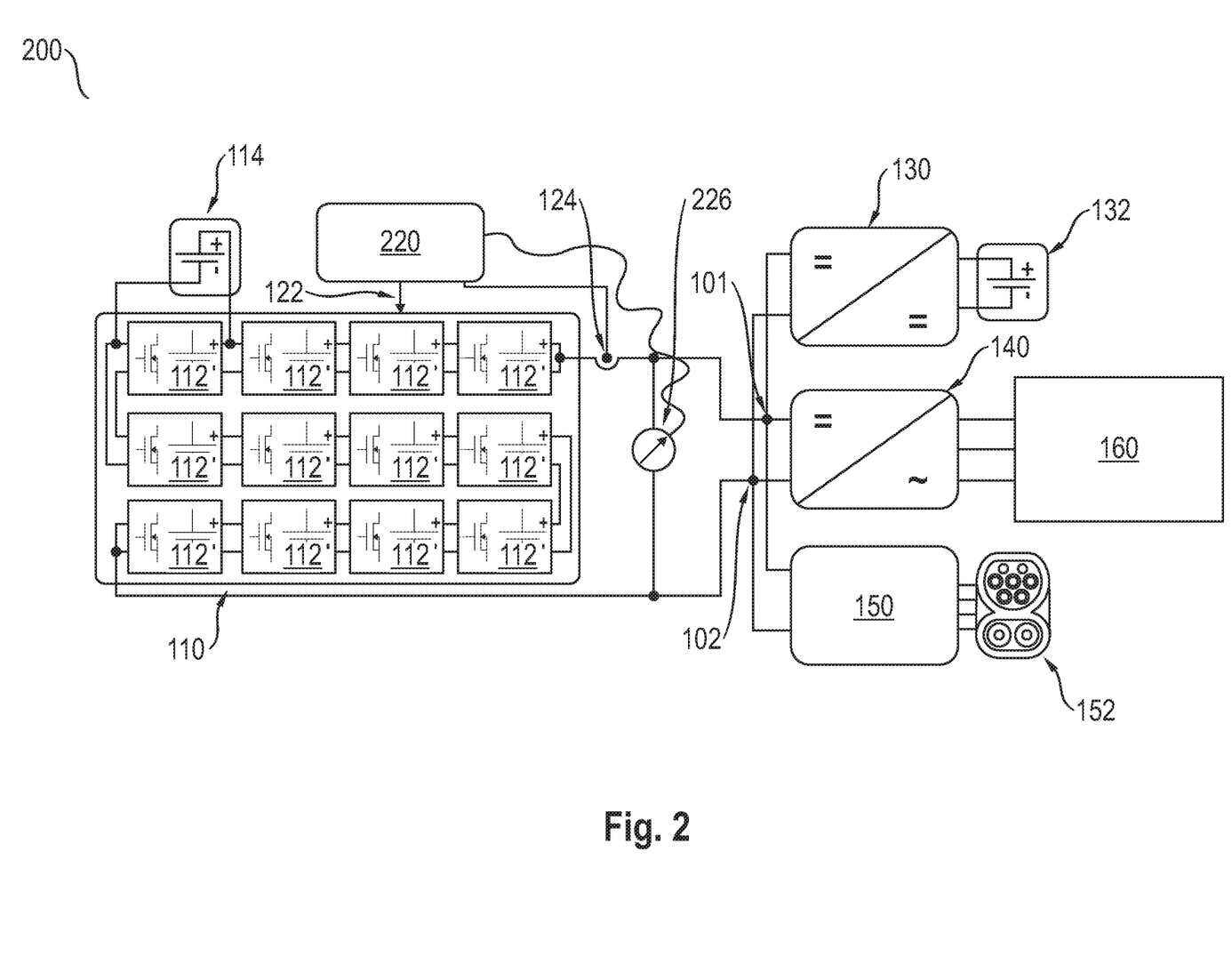
FIG. 2 schematically shows a further configuration of a system according to the invention for providing current control for a flexible DC battery with a voltage measuring device.

FIG. 2 schematically shows a further configuration 200 of a system according to the invention for providing current control for a flexible DC battery, represented by 101, 102, 110, 112, 122, 124, 220, 226, with a voltage measuring device 226. In addition to the value of the current level from the current sensor 124, a DC voltage V measured by the voltage measuring device 226 is also reported to the battery control unit 220, which uses the battery control bus to control the switches of the modules 112 in suitable fashion to align the DC voltage V provided by the battery pack 110 with a target voltage, which is appropriate as a result of a power specification for the electric motor 160, for example, and thus to achieve as high as possible a modulation index in the inverter 140, for example.

Figure 3:
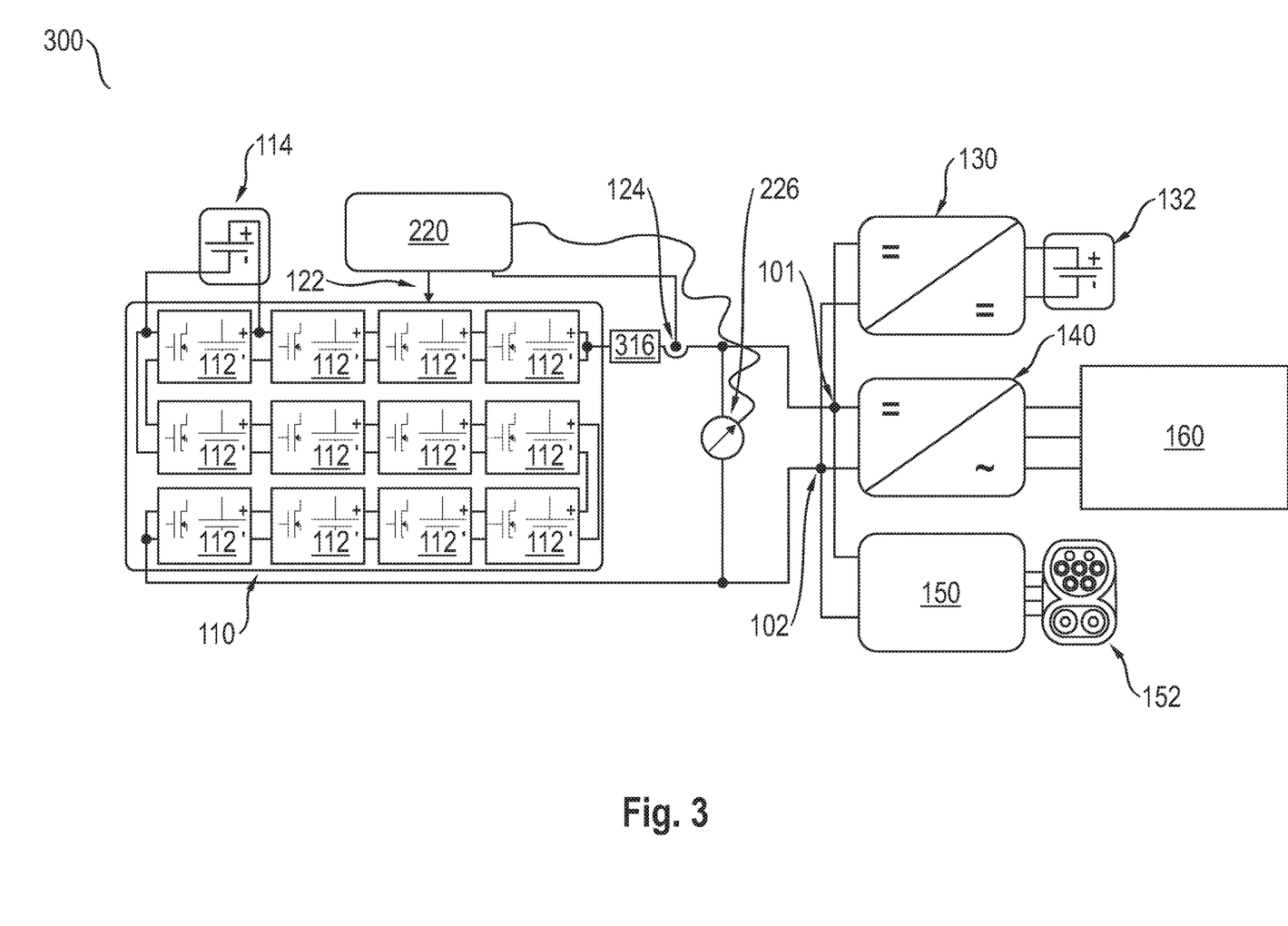
FIG. 3 schematically shows a further configuration still of a system according to the invention for providing current control for a flexible DC battery with an inductance.

FIG. 3 schematically shows a further configuration 300 still of a system according to the invention for providing current control for a flexible DC battery, represented by 101, 102, 110, 112, 122, 124, 220, 226, 316, with an inductance 316. The inductance 316 is preferably arranged inside a battery housing.

Figure 4:
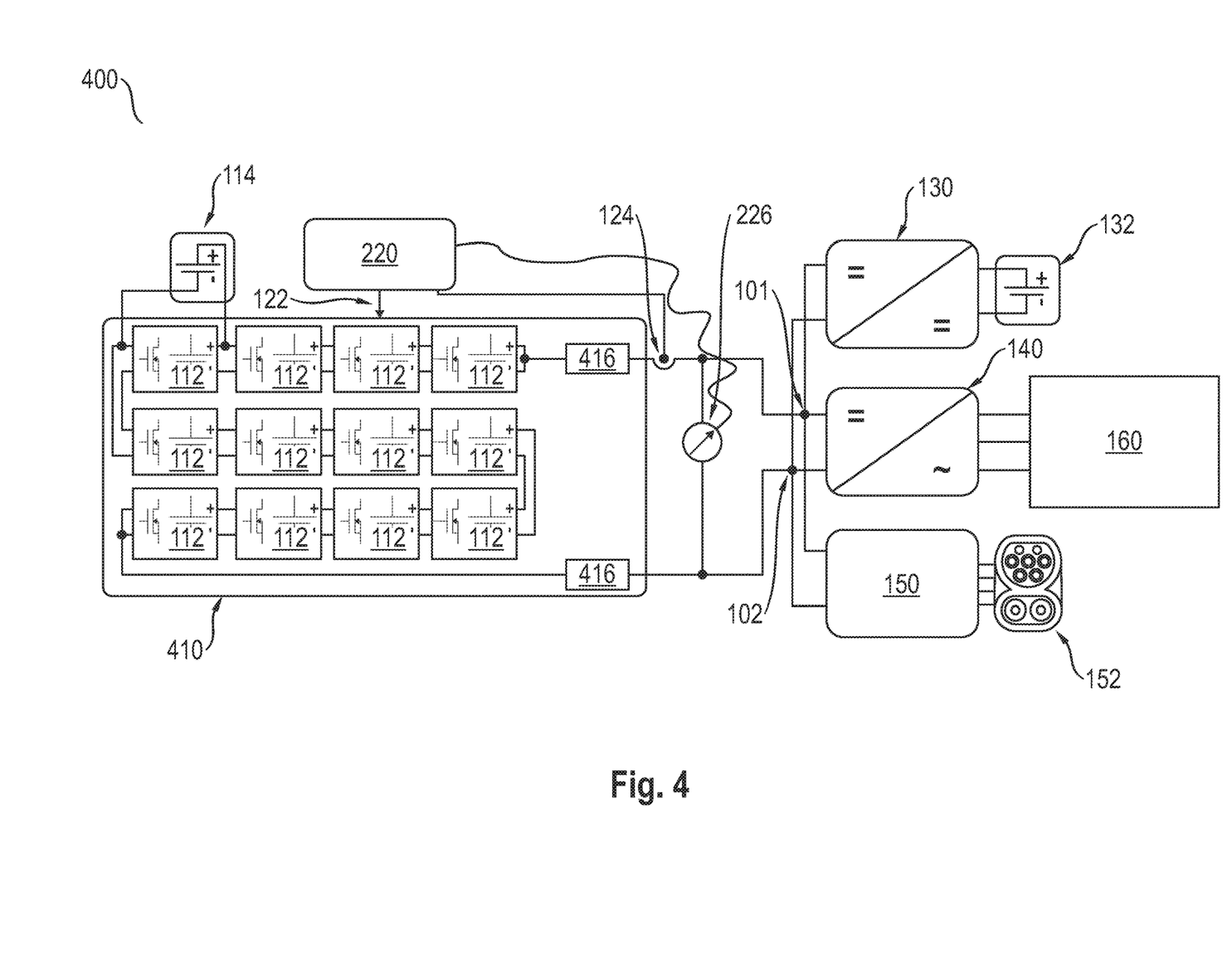
FIG. 4 schematically shows a continuingly further configuration of a system according to the invention for providing current control for a flexible DC battery with two inductances.

FIG. 4 schematically shows a continuingly further configuration 400 of a system according to the invention for providing current control for a flexible DC battery, represented by 101, 102, 112, 122, 124, 220, 226, 410, 416, with two inductances 416. The whole inductance L, which is used according to the invention to limit a change of current dI/dt in accordance with V=L·dI/dt by means of the battery control by adjusting the DC voltage V, is split over the two inductances 416, arranged at the respective section ends.

Figure 5:
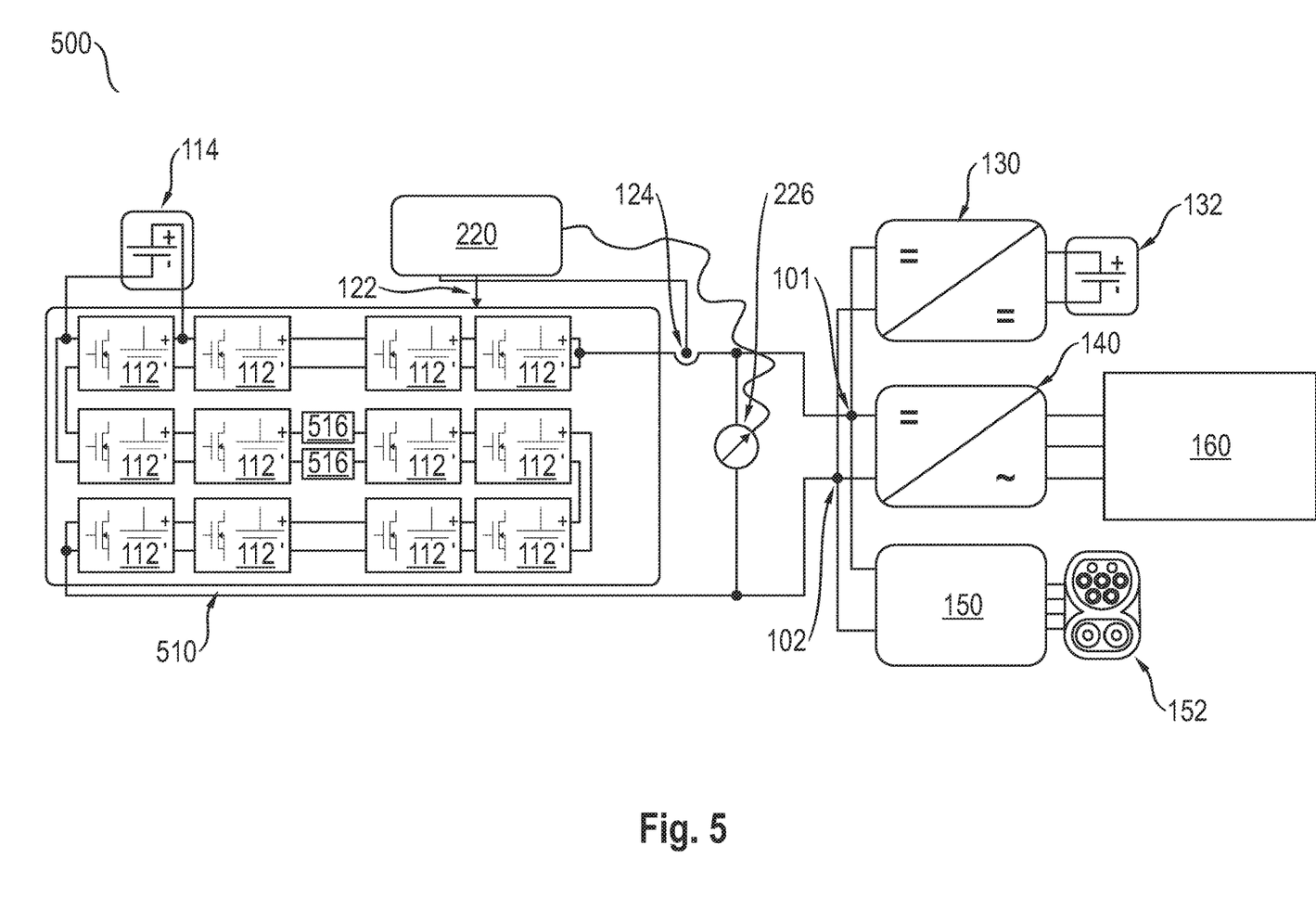
FIG. 5 schematically shows a continuingly further configuration still of a system according to the invention for providing current control for a flexible DC battery with inductances arranged in the middle of the battery pack.

FIG. 5 schematically shows a continuingly further configuration 500 still of a system according to the invention for providing current control for a flexible DC battery, represented by 101, 102, 112, 122, 124, 220, 226, 510, 516, with inductances 516 arranged in the middle of the battery pack. The arrangement in the middle allows even shorts from a respective section half to the vehicle bodywork, for example, to be detected.

Figure 6:
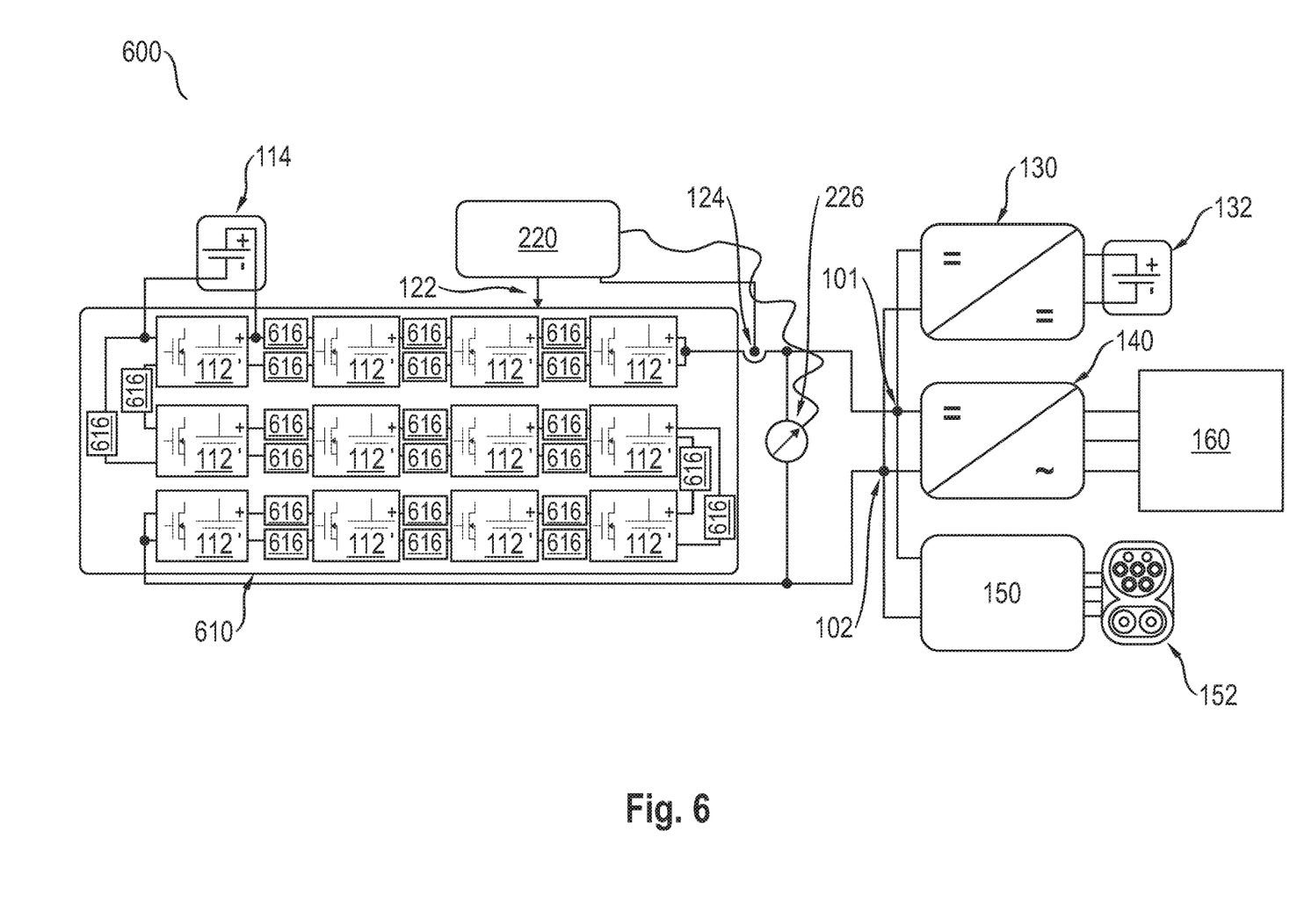
FIG. 6 schematically shows a continuingly further configuration still of a system according to the invention for providing current control for a flexible DC battery with inductances arranged between the modules.

FIG. 6 schematically shows a continuingly further configuration 600 still of a system according to the invention for providing current control for a flexible DC battery, represented by 101, 102, 112, 122, 124, 220, 226, 610, 616, with inductances arranged between the modules. The whole inductance L is distributed over the inductances 616, arranged between the respective modules 112 at the respective section ends. The arrangement between the modules 112 allows shorts from the modules 112 or the connections thereof inside the battery pack to the vehicle bodywork, for example, to be detected.

Figure 7:
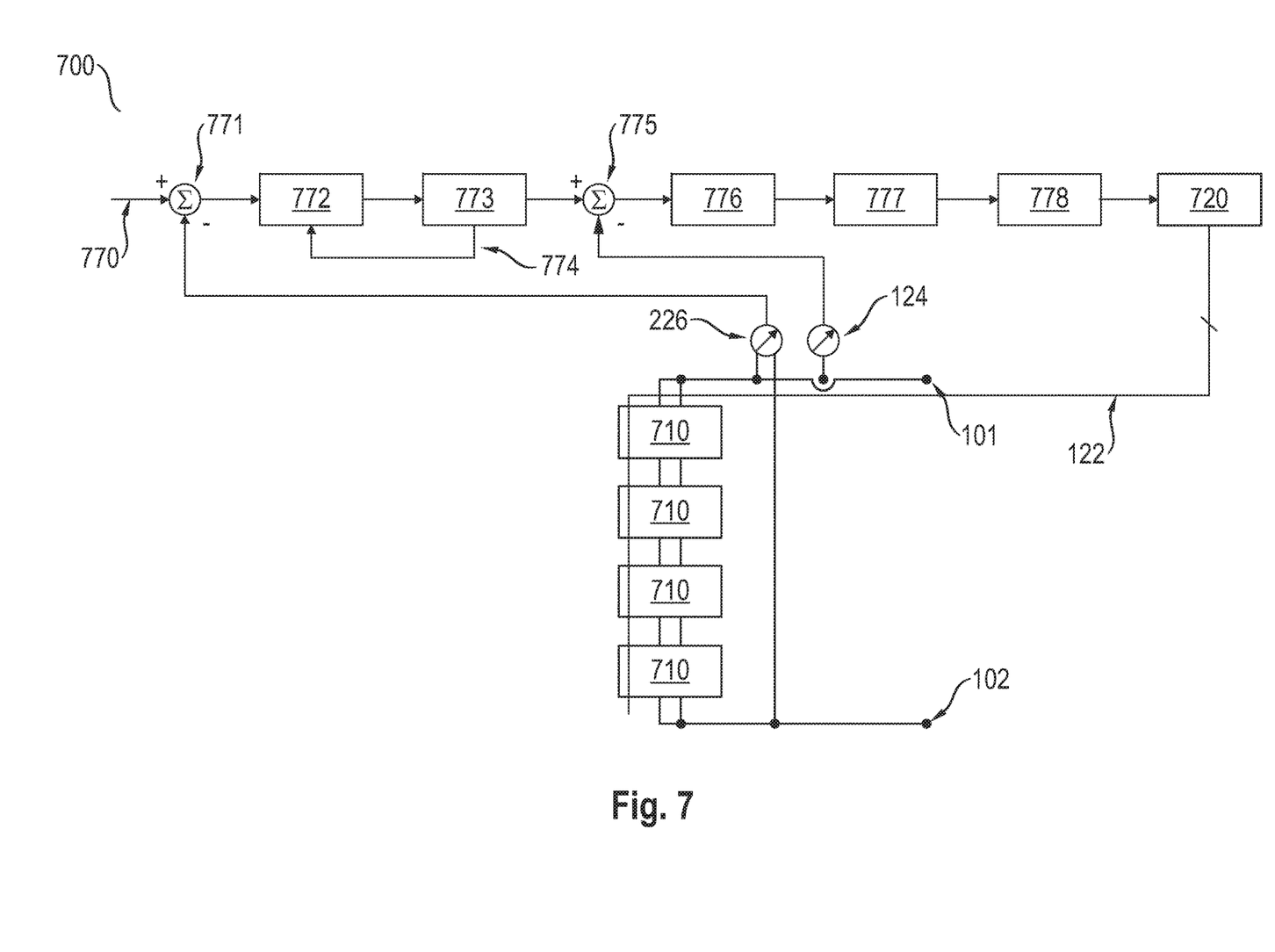
FIG. 7 schematically shows a further configuration of a system according to the invention having a flexible DC battery with PI controllers.

FIG. 7 schematically shows a further configuration 700 of a system according to the invention for providing current control, represented by 770, 771, 773, 774, 775, 777, 778, with PI controllers 772, 776, for a flexible DC battery, represented by 101, 102, 122, 124, 226, 710, 720. The DC voltage measuring device 226 provided by the section with modules 710 is supplied at a negative value to an adder 771 together with a target voltage 770, and as a result a difference is formed as an error signal, said difference being supplied to a first PI controller 772. The output signal of the PI controller 772 can be supplied in exemplary fashion to a controller module 773, which may be configured as a limiter or a compressor, to achieve limiting. Advantageously, a limited output signal of this kind is supplied as a feedback signal 774 to the first PI controller 772, since otherwise an integrating element of the PI controller could charge slowly if the output signal cannot rise further on account of the limiting, for example, on account of a short, even though the target voltage 770 has not yet been reached. Such feedback to avoid integration saturation is also referred to as anti-windup functionality. Alternatively or additionally, the integrating element of the first PI controller 772 can also be stopped or a gain by the integrating element can be reduced as soon as a controller module 773 configured as a limiter engages. In the case of a configuration as a compressor, a gain by the integrating element can further be oriented to a gradient of a limiter transformation curve at the present operating point. Finally, the output signal of the controller module 773 is supplied to a second adder 775. Additionally, a current level measured by the current sensor 124 is supplied as a negative value to the adder 775, as a result of which a difference is formed. Said difference is supplied to a second PI controller 776, the output signal of which is supplied to a modulator 777 and, further on in the control, to a scheduler 778, to finally be routed from the battery controller 720 as a dedicated switching signal to the respective switches of the modules 710 via the battery control bus 122. The configuration shown can therefore be used for free charge and short-circuit management.

Figure 8:
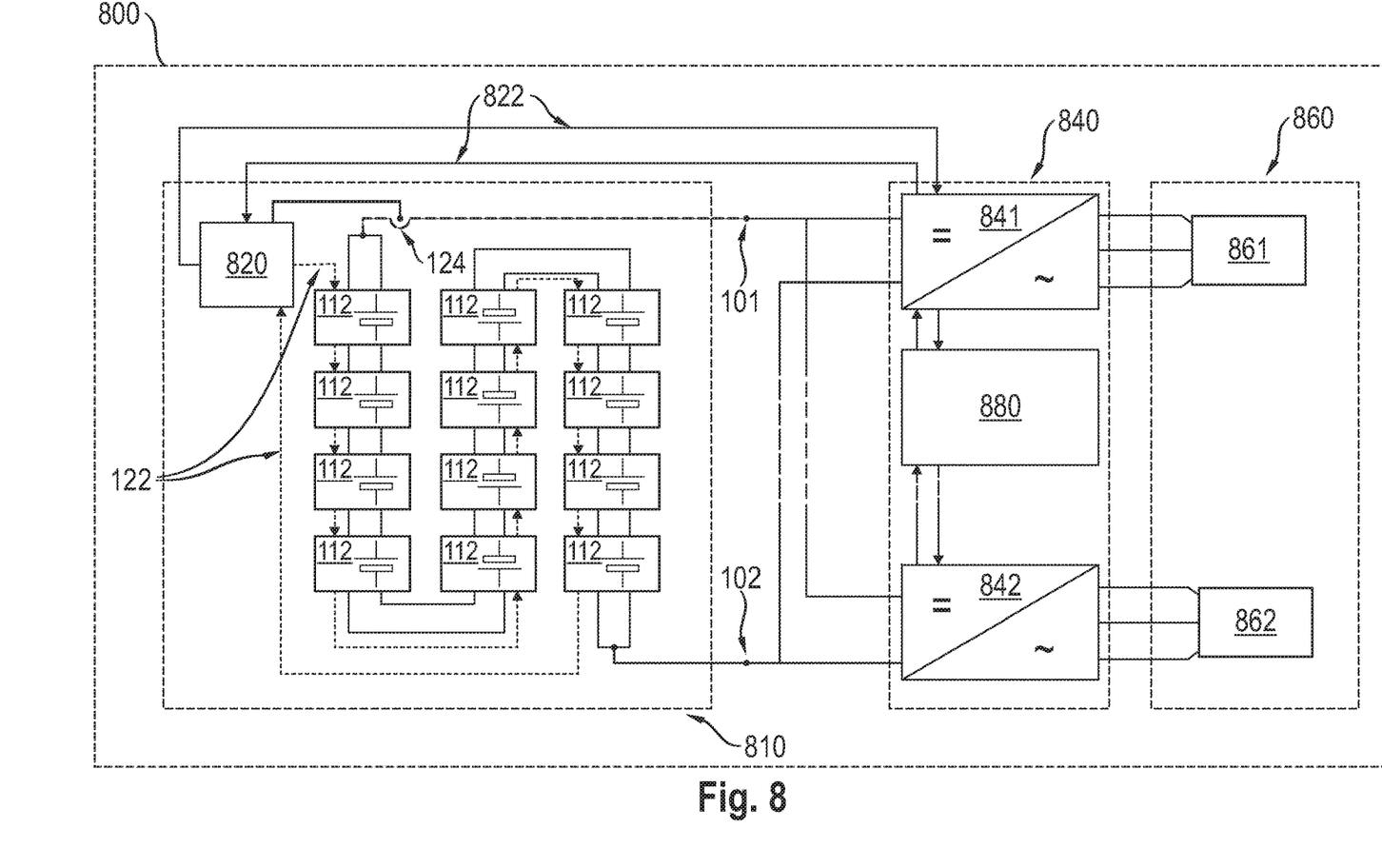
FIG. 8 schematically shows a further configuration still of a system according to the invention having a flexible DC battery with a current sensor.

FIG. 8 schematically shows a further configuration 800 still of a system according to the invention having a flexible DC battery 810 with a current sensor 124. A respective load request or target voltage is communicated to a battery control unit 820 via a load control bus 822. High-voltage loads 840 connected to the high-voltage connections 101, 102 of the flexible DC battery 810 are, for example, a first inverter 841, which supplies AC voltage to a first electric motor 861 of a drive system 860, a second inverter 842, which supplies AC voltage to a second electric motor 862, or else a high-voltage heater 880.

Figure 9:
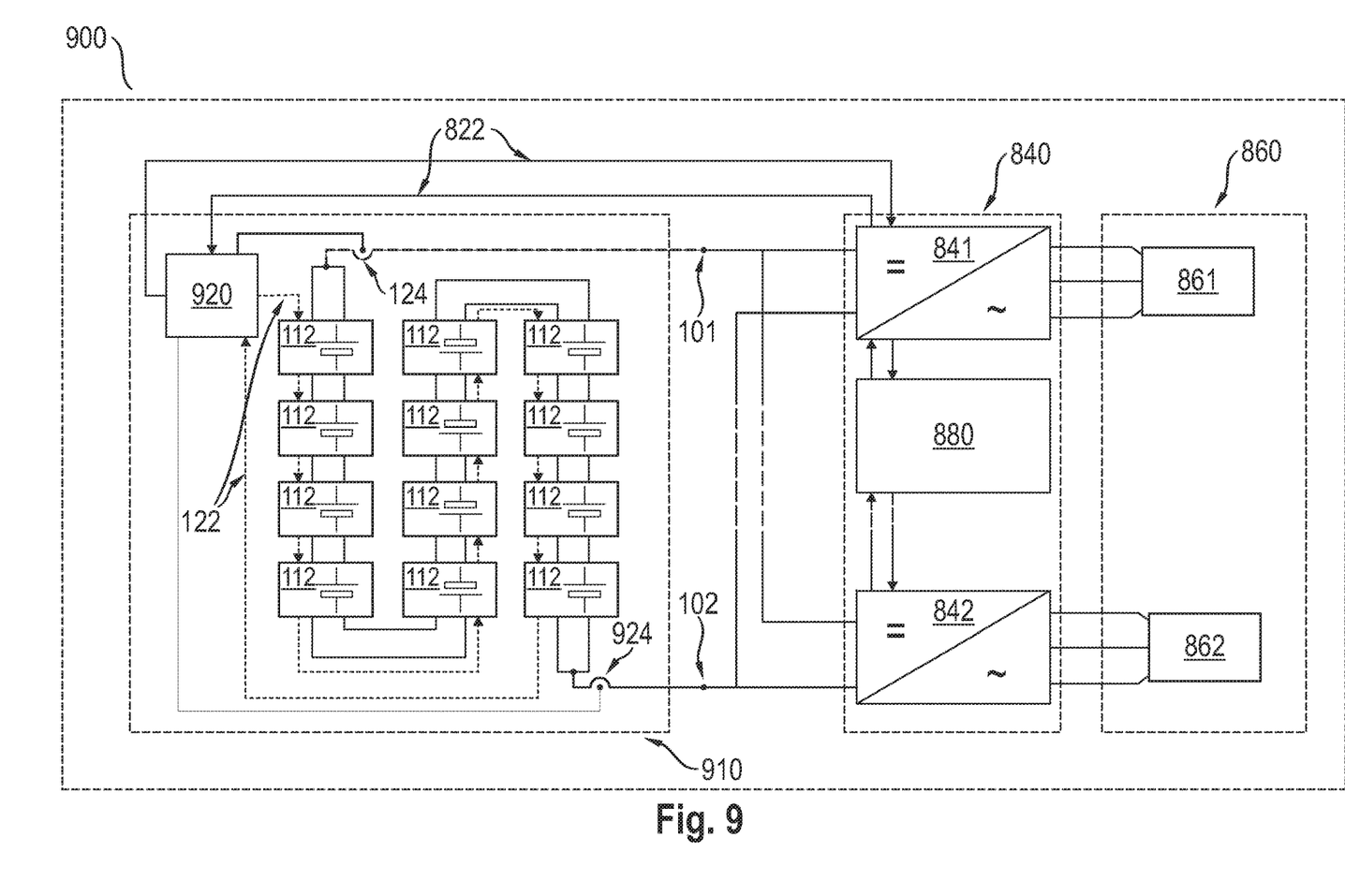
FIG. 9 schematically shows an even further continued configuration of a system according to the invention having a flexible DC battery with two current sensors.

FIG. 9 schematically shows a still further continued configuration 900 of a system according to the invention having a flexible DC battery 910 with two current sensors 124, 924. The arrangement of a respective current sensor 124, 924 at a respective high-voltage connection 101, 102 results in a respective peak current being limitable or being able to be limited as a further control option for the battery control unit 920 when a respective controller is additionally arranged at the respective high-voltage connection 101, 102. This is advantageous in the case of more complicated shorts, for example, to stop or at least control them. Additionally, two current sensors 124, 924 afford redundancy against failure of a single current sensor 124, 924. In addition, a respective arrangement of a current sensor 124, 924 at the respective high-voltage connection 101, 102 is advantageous to test an insulation of the DC battery 910 from a battery housing and a vehicle bodywork. In this case, the battery control unit 920 monitors a sum of the two current levels reported by the current sensors 124, 924, which current levels must be the same if the insulation is intact. It is furthermore also conceivable for a fast rise in a current level or in the sum of both current levels over time to be monitored. In the event of a fast rise with a subsequently high absolute value, the battery control unit 920 assumes that there is damage and initiates a disconnection.

It is to be appreciated that the various features shown and described are interchangeable, that is a feature shown in one embodiment may be incorporated into another embodiment. It is further to be appreciated that the methods, functions, algorithms, etc. described above may be implemented by any single device and/or combinations of devices forming a system, including but not limited to storage devices, processors, memories, FPGAs, DSPs, etc.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

What is claimed is:

1. A method for electronic current control for a flexible DC battery pack, in which the flexible DC battery pack has a plurality of flexibly interconnectable modules having a respective energy store and at least two respective controllable switches and the modules are electrically connected to one another to form a section having a first and a second section end and the two section ends are connected to a respective high-voltage connection side including high voltage potential and low voltage potential connections, in which the at least two switches of a respective module interrupt a battery current I or interconnect the respective energy store at least in series or parallel with or to bypass the respective energy store of the respectively adjacent module, comprising controlling the flexible interconnection of the modules by a battery control unit to provide a prescribed DC voltage V;

arranging a first current sensor between the first of the two section ends and the high-voltage connection connected thereto, and said first current sensor is connected to the battery control unit; and arranging a second current sensor between the second section end and the high-voltage connection connected thereto and connecting the second current sensor to the battery control unit, as a result of which a current spike on the respective high-voltage connection can be regulated and an insulation of the battery pack from a surrounding area can be monitored, wherein electronic control controls the battery current I by means of the interconnection of the modules by the battery control unit.

2. The method as claimed in claim 1, further comprising arranging at least one inductance L upstream of at least one high-voltage connection within a circuit of the battery pack, as a result of which the prescribed DC voltage V provided by the battery control unit by means of the modules is used to limit a magnitude of a change of current dI/dt in accordance with an equation where the prescribed DC voltage $V=L \cdot dI/dt$.

3. The method as claimed in claim 2, restricting by the electronic control the battery current I if a predetermined threshold $I_{threshold}$ is exceeded.

4. The method as claimed in claim 3, in which the electronic control is carried out by a PI controller having a proportional element and an integral element.

5. The method as claimed in claim 4, wherein an output signal of the PI controller is applied to a limiter and engagement of the limiter results in the integral element in the PI controller being stopped or a current gain being reduced.

6. The method as claimed in claim 4, wherein an output signal of the PI controller is applied to a compressor and the current gain is oriented to a gradient of a limiter transformation curve at a present operating point.

7. The method as claimed in claim 1, further comprising arranging a fuse between one of the two section ends and the high-voltage connection connected thereto, which fuse interrupts the battery current I if a predetermined threshold $I_{threshold}$ is exceeded.

8. A system for electronic current control for a flexible DC battery pack, the system comprising:

the flexible DC battery pack having a plurality of flexibly interconnectable modules, wherein each module has a respective energy store and at least two respective controllable switches by means of which a battery current I is interruptible or the respective energy store is interconnectable at least in series or parallel with or to bypass the respective energy store of a respectively adjacent module, and wherein the modules are electrically connected to one another to form a section having a first section end and a second section end and the two section ends are connected to a respective high-voltage connection;

a battery control unit configured to control the flexible interconnection of the plurality of modules and hence to provide a prescribed DC voltage V; and a first current sensor, arranged between the first section end and the high-voltage connection connected thereto, that is connected to the battery control unit; and a second current sensor is additionally arranged between the second section end and the high-voltage connection connected thereto, wherein a current spike on the respective high-voltage connection can be regulated and an insulation of the battery pack from a surrounding area can be monitored, wherein the system is configured to electronically control the battery current I by means of the interconnection of the modules by the battery control unit.

9. The system as claimed in claim 8, further comprising a fuse configured to interrupt the battery current I if a predetermined threshold $I_{threshold}$ is exceeded.

10. The system as claimed in claim 8, further comprising a voltage measuring device, arranged between the two high-voltage connections, that is connected to the battery control unit.

11. The system as claimed in claim 10, further comprising at least one inductance L arranged upstream of at least one high-voltage connection within a circuit of the battery pack to use the prescribed DC voltage V provided by the battery control unit by means of the modules to limit a magnitude of a change of current dI/dt in accordance with an equation where the prescribed DC voltage $V=L \cdot dI/dt$.

12. The system as claimed in claim 10, wherein the system is configured to carry out the electronic control by means of a PI controller having a proportional element and an integral element.

\* \* \* \* \*